US005745776A

United States Patent [19]
Sheppard, II

[11] Patent Number: 5,745,776
[45] Date of Patent: Apr. 28, 1998

[54] ENHANCED ELECTRONIC DICTIONARY

[76] Inventor: Charles Bradford Sheppard, II, 170 Woodland Rd., Huntingdon Valley, Pa. 19006

[21] Appl. No.: 424,817

[22] Filed: Apr. 19, 1995

[51] Int. Cl.[6] .................................................. G06F 9/00
[52] U.S. Cl. ................................................... 395/794
[58] Field of Search ...................... 364/419.09, 419.11; 395/794

[56] References Cited

U.S. PATENT DOCUMENTS

| | | |
|---|---|---|
| 3,566,483 | 3/1971 | Morehand . |
| 4,519,606 | 5/1985 | Lussiez . |
| 4,579,533 | 4/1986 | Anderson et al. . |
| 4,712,180 | 12/1987 | Fujiyama et al. . |
| 4,891,775 | 1/1990 | McWherter . |
| 4,912,671 | 3/1990 | Ishida . |
| 4,968,257 | 11/1990 | Yalen . |
| 5,035,625 | 7/1991 | Munson et al. . |
| 5,180,309 | 1/1993 | Egnor . |
| 5,203,705 | 4/1993 | Hardy . |
| 5,219,291 | 6/1993 | Chi-Ming Fong et al. . |
| 5,241,671 | 8/1993 | Reed et al. . |
| 5,256,067 | 10/1993 | Gildea et al. . |
| 5,257,185 | 10/1993 | Farley et al. . |
| 5,261,823 | 11/1993 | Kurokawa . |
| 5,267,865 | 12/1993 | Lee et al. . |
| 5,302,132 | 4/1994 | Corder . |
| 5,308,244 | 5/1994 | Hirose . |
| 5,316,485 | 5/1994 | Hirose . |
| 5,421,731 | 6/1995 | Walker . |
| 5,551,049 | 8/1996 | Kaplan et al. ......................... 395/794 |

FOREIGN PATENT DOCUMENTS 6-250582 A  9/1994  Japan .

OTHER PUBLICATIONS

Matson, Dan M., "The Oriya Language Textbook Series, vol. Eight: Oriya Word Count", Cornell University, Ithaca, NY. Jul. 1970.

Carroll, John B., "Behind the Scenes in the Making of a Corpus-Based Dictionary and a Word Frequency Book", paper presented at the convention of the National Council of Teachers of English, Las Vegas, Nevada, Educational Testing Service, Nov. 1971.

Manelis, Leon, "The American Heritage Word Frequency Book and Its Relation to the Communication Lexicon", Southwest Regional Laboratory Technical Note No. 2-72-38, Los Alamitos, CA. Sep. 1972.

Hopkins, Carol J. and Moe, Alden J., The Computer-Assisted Indentification of Common Word Strings From the Text of Children's Books, paper presented at the 23rd Annual Convention of the International Reading Association, Houston, TX. May 1978.

MicroSIFT, "Evaluator's Guide for Microcmputer-Based Instructional Packages", International Council for Computers in Education, Eugene, Oregon. 1983.

Damerau, Fred J., "Evaluating Computer-Generated Domain-Oriented Vocabularies", Information Processing & Management, vol. 26, No. 6, pp. 791-801. 1990.

(List continued on next page.)

*Primary Examiner*—Phu K. Nguyen
*Attorney, Agent, or Firm*—Miller & Christenbury

[57] ABSTRACT

An enhanced electronic reference having a memory with a database of entries. The database of entries includes general entries and topic entries. Each general entry has a general word, a general definition and a tag identifying each definition as general. Each topic entry has a topic word, a topic definition and a topic tag which identifies the topic from which the topic word is selected. The memory also includes a series of commands to retrieve and communicate the general and topic definitions. The enhanced electronic reference also includes an input device for receiving a selected topic and a selected word, an output device for communicating general and topic definitions and a processor for executing the commands.

13 Claims, 13 Drawing Sheets

OTHER PUBLICATIONS

Breland, Hunter M. et al., "The College Board Vocabulary Study", College Board Report No. 94-4, College Entrance Examination Board, New York, NY. 1994.

Microsoft, Encarta, pp. 1-3, 1997.

Microsoft Bookshelf '95, four pages of screen displays labeled Nos. 1-4, and the Bookshelf '95 brochure., 1995.

Knowledge Adventure, Inc., Isaac Asimov Science Adventure II User Guide, 1994.

Knowledge Adventure, Inc., Isaac Asimov Science Adventure II Quick Reference Guide, 1994.

Harold D. Nathan, Ph.D., Cliffs Notes, Inc., Cliffs Notes Review™—Chemistry, 1993.

Cliffs Notes, Inc., Cliffs StudyWare®Course Review User's Manual, 1993.

Smartek Software, Facts About WordSmart®, 1993.

Smartek Software, WordSmart® User Guide CD-Rom Version, Dec. 1993.

Cliffs Notes, Inc., Cliffs StudyWare® For Chemistry, 1993.

Smartek Software, WordSmart®?...(Advertisement), 1993.

Centron Software, Crossword Creator (Windows), 1993.

WordSmart, Practical Home Schooling, Fall 1993, pp. 50-51.

Carroll, John B., Abstract, Behind the Scenes in the Making of a Corpus-Based Dictionary and a Word Frequency Book, Nov. 1971, Dialog-Eric database.

"IBM" Education Local Area Network and Tools (EdLAN), sales brochure, Jan. 1991.

Breland, Hunter M., Abstract, The College Board Vocabulary Study, College Board Report No. 94-4, Dialog-Eric database, 1994.

| DATABASE OF ENTRIES ||
| --- | --- |
| GENERAL ENTRIES | TOPIC ENTRIES |
| • General Words and Word Combinations<br>• General Definitions<br>• Objective Ratings<br>• Tags<br>• Sample Sentences<br>• Pronunciations<br>• Synonyms<br>• Antonyms<br>• Supplemental Information | • Topic Words and Word Combinations<br>• Topic Definitions<br>• Objective Ratings<br>• Tags<br>• Sample Sentences<br>• Pronunciations<br>• Synonyms<br>• Antonyms<br>• Supplemental Information |

Fig. 2

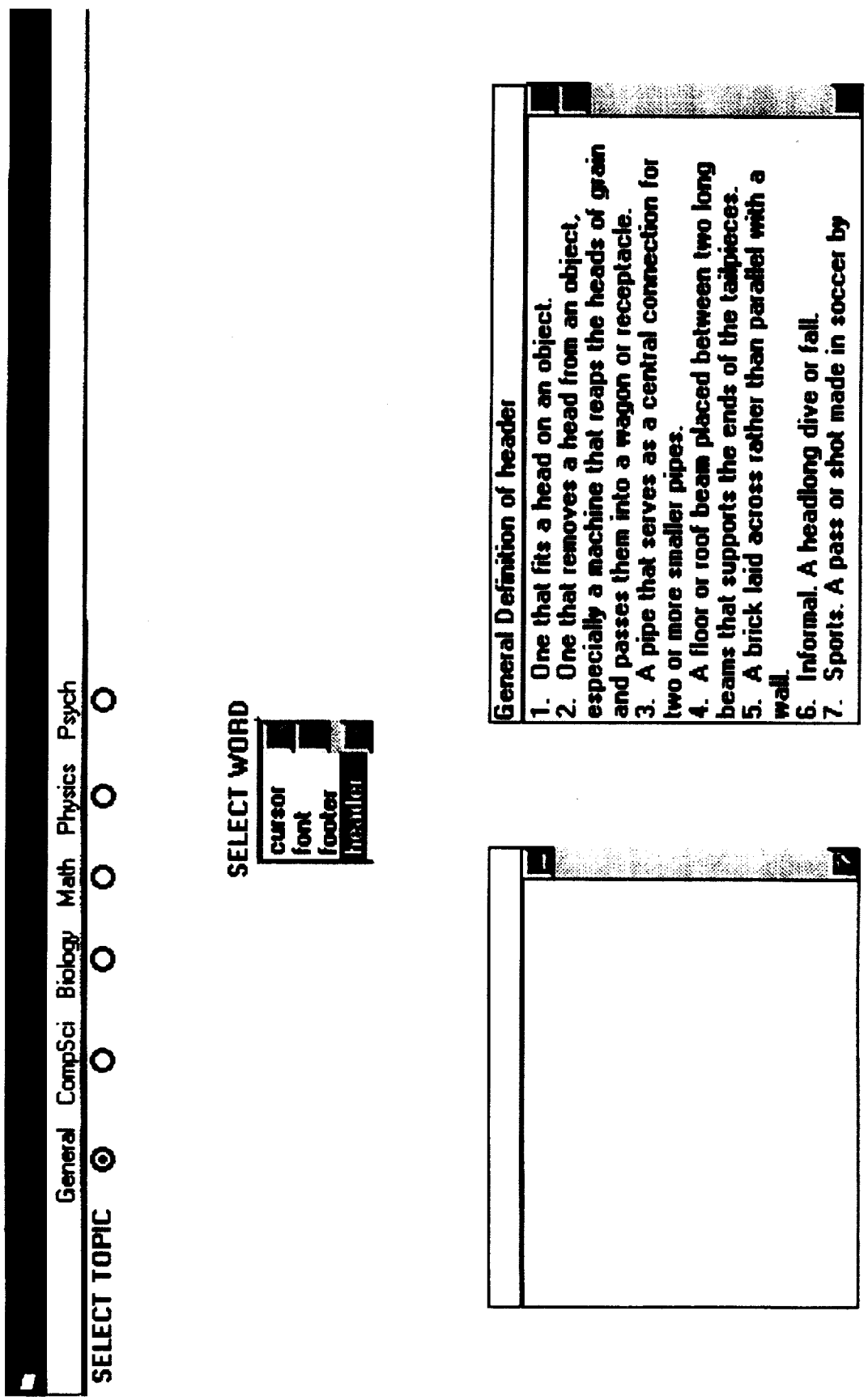

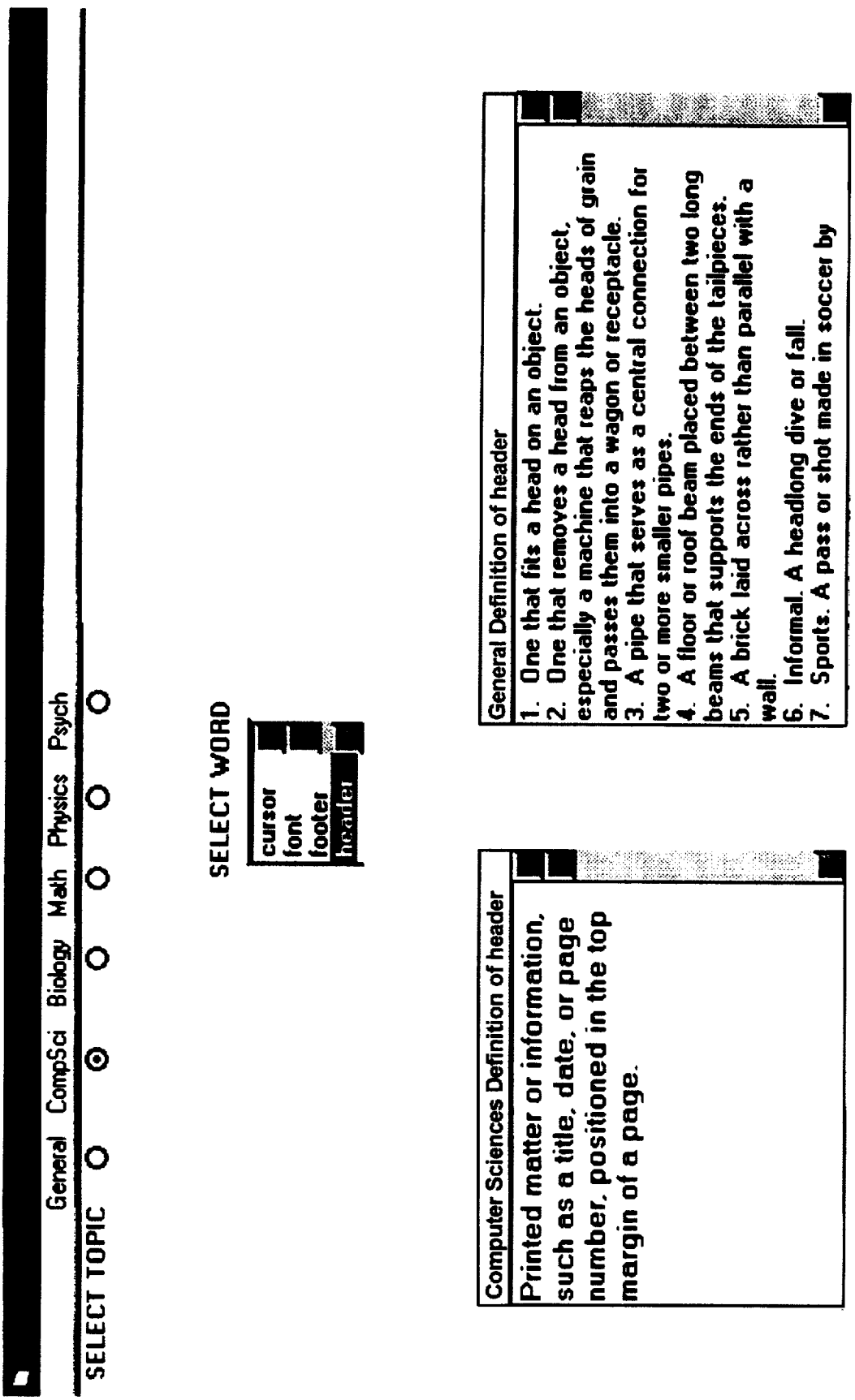

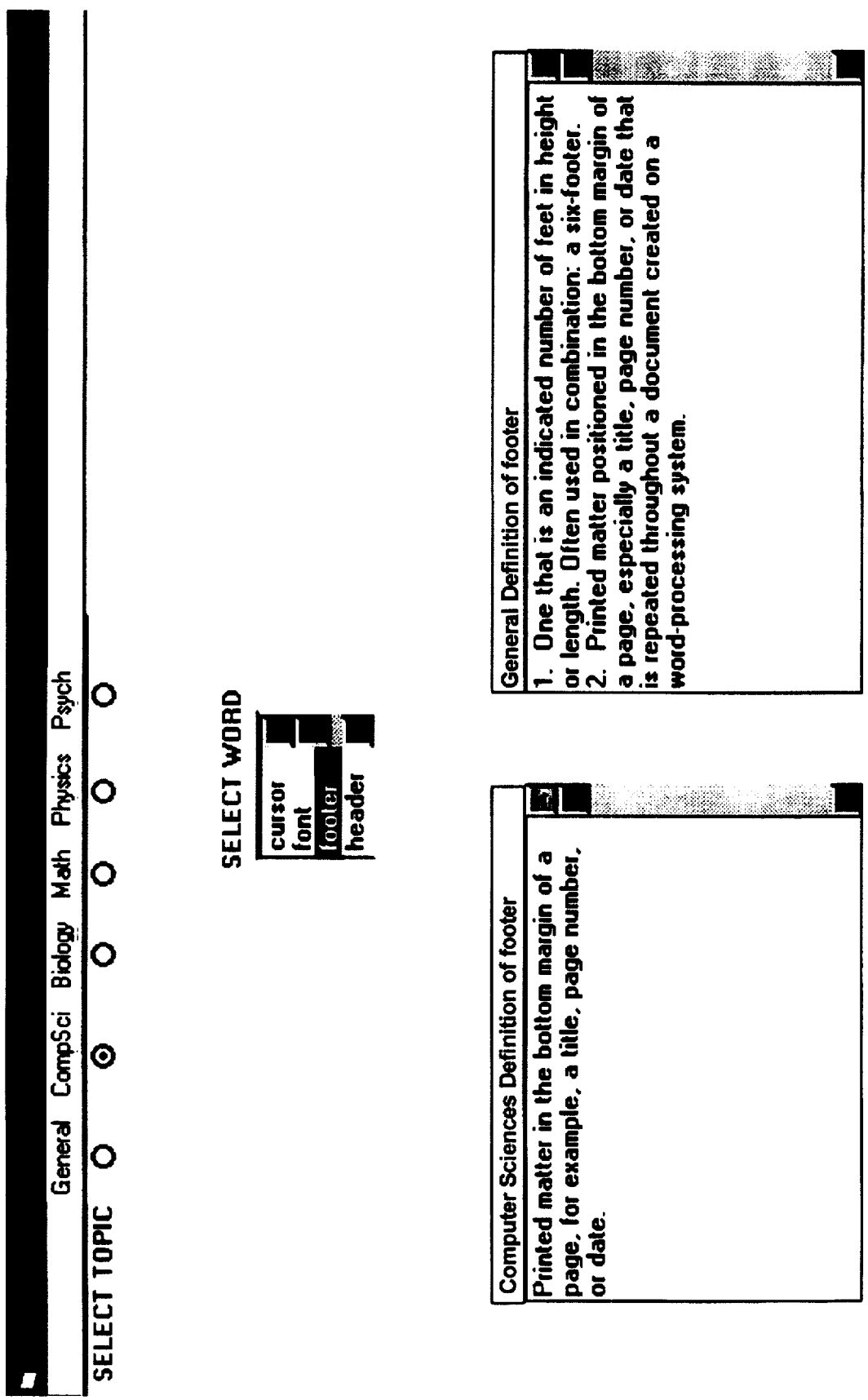

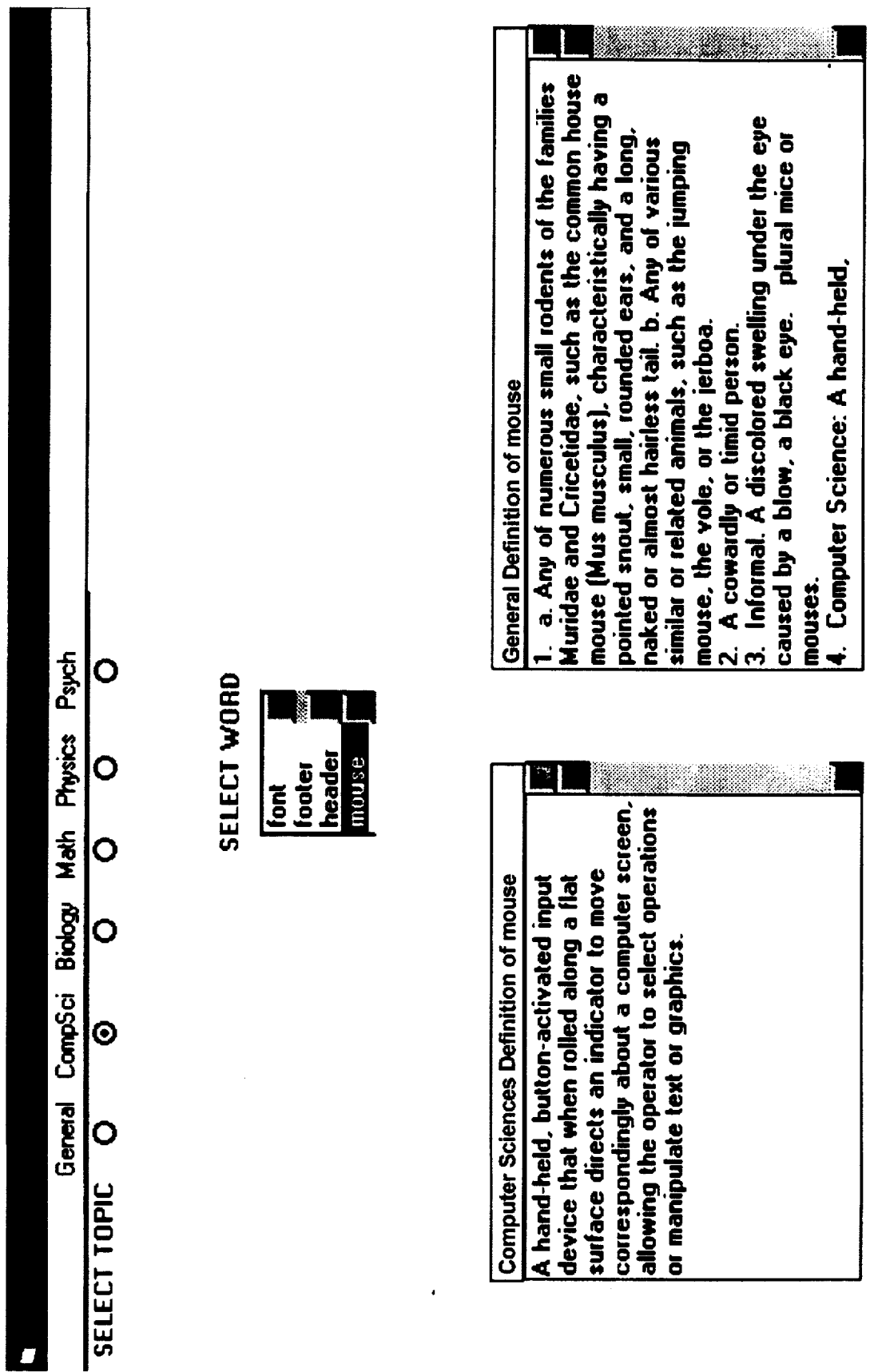

ENHANCED ELECTRONIC DICTIONARY

BACKGROUND OF THE INVENTION

This invention provides an enhanced electronic dictionary characterized by ease of use. This invention also provides a method for creating an enhanced electronic dictionary and a method for providing information to a system user.

FIELD OF THE INVENTION

The advent of the compact disk (CD), capable of storing in excess of 600 megabytes (or 300,000 pages) of data, as well as CD read-only memory (CD-ROM) devices, has made numerous references available for use on personal computers. CDs are now available with a wide variety of reference works, including dictionaries and thesauri. However, existing dictionary references have several shortcomings.

Collegiate dictionaries fail to include many important words used in specific disciplines. The American Heritage Dictionary Ed. 3 is available for computer use but provides limited coverage of words relating to specific disciplines.

On the other hand, several unabridged dictionaries are available for computer use, including the Random House Unabridged Dictionary and the Oxford English Dictionary, but they are cumbersome because they often provide many definitions without regard to user needs. A dictionary user should review the many definitions and determine which definition is appropriate for a particular usage.

In U.S. Pat. No. 5,241,671, incorporated herein by reference, Reed et al. discloses the structure and logic of a multimedia search system that includes a dictionary function (described by Reed at Column 14). The Reed dictionary function allows a user to select a word to be defined. The dictionary function then provides a display in which dictionary entries for the selected word are displayed as they appear in a printed dictionary.

The Reed dictionary function is deficient in that word meanings are provided without regard for the user's topic of interest. Also, a Reed dictionary function user may not have access to definitions for many words relating to specified disciplines.

OBJECTS OF THE INVENTION

It is an object of this invention to provide an electronic dictionary that overcomes the problems associated with the prior art.

It is another object of this invention to provide an enhanced electronic dictionary.

Another object of the invention is to provide a dictionary that is easy to use.

It is another object of this invention to provide a method for creating an enhanced electronic dictionary.

It is still another object of this invention to provide a system for utilizing the enhanced electronic dictionary.

Other important objects will become apparent to one of ordinary skill in the art in view of the descriptions that follow.

SUMMARY OF THE INVENTION

An enhanced electronic dictionary, according to this invention, includes a read-only memory, a random access memory, an input device, an output device and a central processing unit. In the read-only memory is stored a database and software commands.

The database contains general entries, each including a general word, a general word definition, an objective rating, and a tag to indicate that it is a general entry. The database also contains topic entries from one or more topics, each topic entry including a topic word, a topic definition, an objective rating, and a tag indicating the topic.

Software commands are provided for retrieving definitions and displaying the definitions based upon criteria selected by a dictionary user. Software commands are optionally provided to enable a dictionary user to identify difficult words in a writing sample and to increase the user's vocabulary.

Also provided is a method for creating an enhanced electronic dictionary according to this invention.

BRIEF DESCRIPTION OF THE DRAWINGS

FIG. 2 summarizes the contents of an embodiment of a database component of the enhanced electronic dictionary according to this invention.

FIG. 5A illustrates the computer screen display of FIG. 4, wherein the topic "General" and the word "header" are selected.

FIG. 6 illustrates the computer screen display of FIG. 4, wherein the topic "CompSci" and the word "header" are selected.

FIG. 7 illustrates the computer screen display of FIG. 4, wherein the topic "CompSci" and the word "footer" are selected.

FIG. 8 illustrates the computer screen display of FIG. 4, wherein the topic "CompSci" and the word "mouse" are selected.

DETAILED DESCRIPTION OF THE INVENTION

Figure 1:
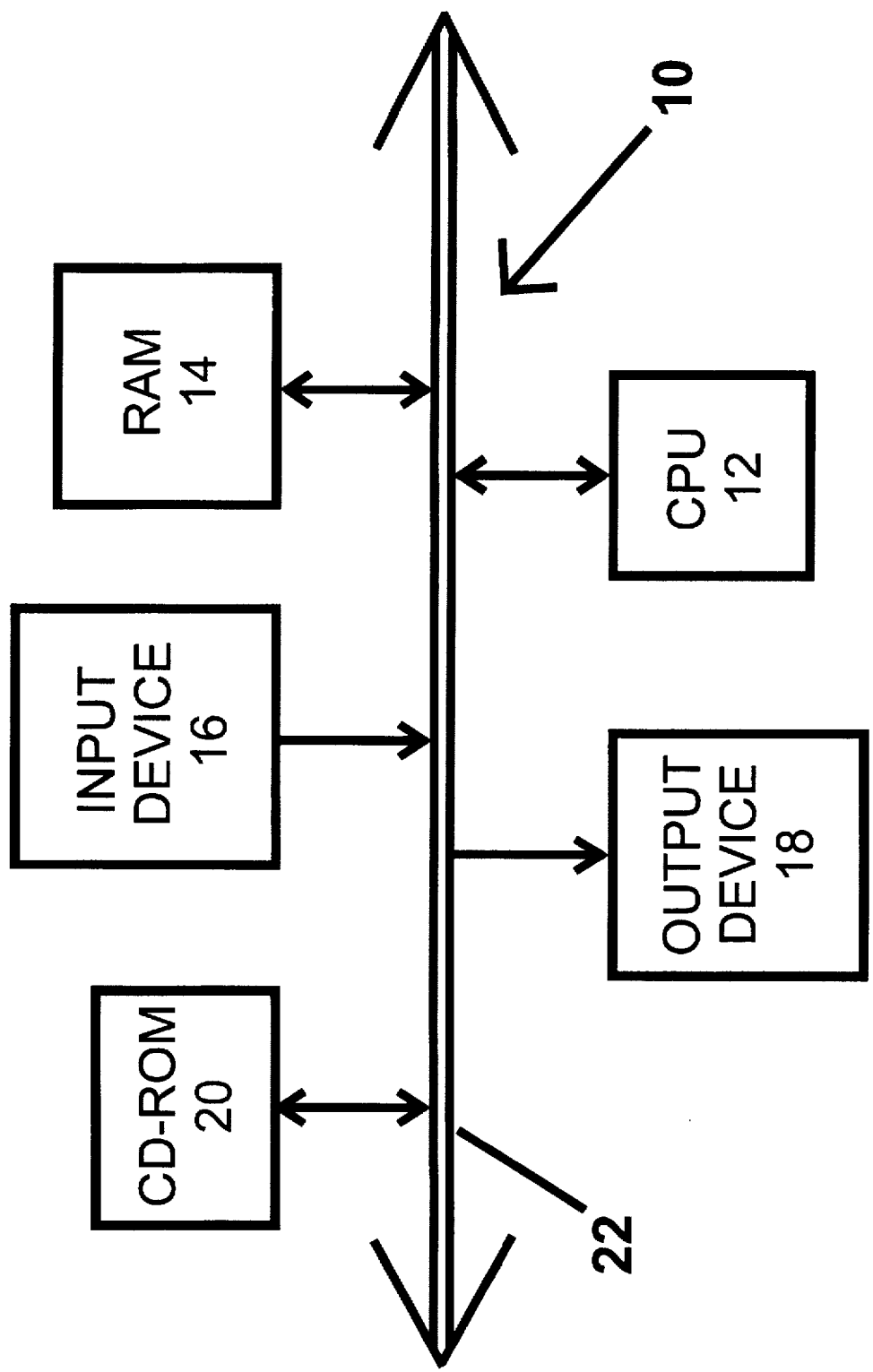
FIG. 1 is a block diagram illustrating components of one embodiment of an enhanced electronic dictionary according to this invention.

The following description is intended to refer to the specific embodiments of the invention illustrated in the drawings. This description is not intended to define or limit the scope of the invention, which is defined separately in the claims that follow.

In FIG. 1, the numeral "10" designates generally hardware components of one embodiment of an enhanced electronic dictionary system according to this invention. A central processing unit (CPU) 12 is provided for processing data. CPU 12 is preferably an IBM-compatible personal computer that is at least as powerful as a computer with an INTEL 486 computer chip, or any equivalent processing system. System 10 also includes a random access memory (RAM) 14 to provide storage for all data and software necessary to execute a program. RAM 14 preferably includes at least four megabytes of memory or any measure of memory capable of receiving significant quantities of data and software commands. Also included in system 10 is an input device 16 to permit communication from a system user to CPU 12. A variety of input devices are optionally used, including a standard keyboard, a mouse, a voice processor, a microphone, a light pen or any other input device capable of transferring information from the user to system 10.

System 10 also includes an output device 18 for communication of information from system 10 to a system user. A variety of output devices is contemplated including, for example, a cathode ray tube (CRT), a speaker, a voice synthesizer, a printer or any other output device.

A compact disk read-only memory (CD-ROM) 20 is also included in system 10. CD-ROM 20 is just one example of many known read-only memory components. CD-ROM 20 is optionally substituted with a high-capacity hard drive or any other memory device capable of storing a large database of information. CD-ROM 20 is also optionally a recording device.

The system components shown in FIG. 1 are interconnected by a bus 22 to provide data transfer paths between various hardware components.

FIG. 2 summarizes the contents of a "Database of Entries" that will preferably be stored in CD-ROM 20 (shown in FIG. 1). The term "entry" as used herein means a subset of information. The term "dictionary" as used herein is intended to encompass not only standard dictionary references, but also an expanded reference optionally including, for example, sentences, pronunciations, thesaurus components and other optional features.

The "Database of Entries" includes "General Entries" and "Topic Entries". General entries are analogous to entries in a general dictionary such as, for example, Webster's New Collegiate Dictionary, published by G. & C. Merriam Company. Each general entry includes a general word. The term "word" as used herein is intended to encompass single words, word combinations, phrases, independent letters and combinations of letters, whether set solid, joined by a hyphen or separated by one or more spaces. Each general entry also includes at least one general definition which provides the meaning of the general word.

Each general entry is also provided with an objective rating. An objective rating is preferably a rating that does not depend on an opinion and preferably relates to the relative importance or difficulty of each word with respect to other words. One such objective rating is based upon the frequency with which the corresponding general word appears in a selected literary sample. Frequency provides a measure of relative importance—the more frequently a word appears in a literary sample, the more important that word is to the understanding of the sample. Also, infrequently occurring words are often more difficult to understand than frequently occurring words because there are fewer opportunities to learn their meaning.

A suitable language sample is easily scanned to determine the frequency count for each general word so that an objective rating can be assigned to each general word. An objective rating based on frequency is optionally a ranking. For example, if a general word appears in a language sample more often than 75% of the other general words, then that word ranks in the 75th percentile and optionally is assigned an objective rating of 75.

Another example of an objective rating is the percentage of a suitable sample of people that know each general word. This provides another measure of relative importance and difficulty. For example, if 75% of the people sampled know the meaning of a general word, then that word ranks in the 75th percentile and is optionally assigned an objective rating of 75.

Each general entry also is provided with at least one tag. The tag is any indicator of a characteristic of the general entry. For example, general entries are provided with a tag to indicate the general nature of their words and definitions. Tags are also optionally provided to indicate a difficulty level or suitable educational level for each entry.

Each general entry optionally includes sample sentences, such as context sentences showing words in context and illustrative sentences indicating word meanings. Each general entry also optionally includes a pronunciation guide suited for speech recognition and audible pronunciation. Also, synonyms, antonyms and other words associated with a general word are optionally included in each entry.

Optionally included in each general entry is supplemental information pertaining to the general word. Supplemental information optionally includes any information that facilitates better understanding of the general word.

Topic entries are analogous to entries from specific topical dictionaries. Many such dictionaries have been written to provide detailed definitions of industry- and field-specific words or phrases. Examples of topical dictionaries include the IBM Dictionary of Computing, published by McGraw-Hill, Inc.; the McGraw-Hill Dictionary of Scientific and Technical Terms, published by McGraw-Hill, Inc.; and Black's Law Dictionary, published by West Publishing Co. Other examples of topical dictionaries include medical dictionaries, children's dictionaries and many other specialized dictionaries as well as glossaries from textbooks or other sources. Dictionaries and similar resources are available for a wide variety of topics including, for example, chemistry, physics, biology, sociology, mathematics, earth science, psychology, law, finance, computer science, medicine, zoology, botany and many other disciplines.

Each topic entry includes a topic word and at least one corresponding topic definition, wherein the topic definition describes the topic word meaning within the context of the particular topic. The topic definition most preferably includes a formal definition as well as a simplified definition that is written so as to be understood by a layperson. Each topic entry also includes an objective rating. If a frequency rating is used as the objective rating, the frequency is determined by establishing a frequency count for the topic word in a literary sample within the appropriate topic. For example, the frequency count for a topic word from the medical field could be determined using a medical textbook. An objective rating based on a frequency count is assigned to a topic word in the same way as it is assigned to a general word. If the objective rating is based on the percentage of people within a sample that know a word meaning, then the people comprising the sample are selected from those with knowledge of the topic.

Each topic entry is provided with at least one topic tag to identify the topic from which each entry originated. Such tags are optionally broad (i.e., corresponding to "science") or are more specific (i.e., corresponding to "physics"). Tags are also optionally provided to indicate a difficulty level or suitable educational level for each entry, within the particular topic.

Each topic entry optionally includes sample sentences, such as context sentences and illustrative sentences, both of which illustrate word meanings within their specific topic. Each topic entry also optionally includes a pronunciation guide as well as synonyms, antonyms and other words that are associated with a topic word and that are relevant to the topic.

Figure 10:
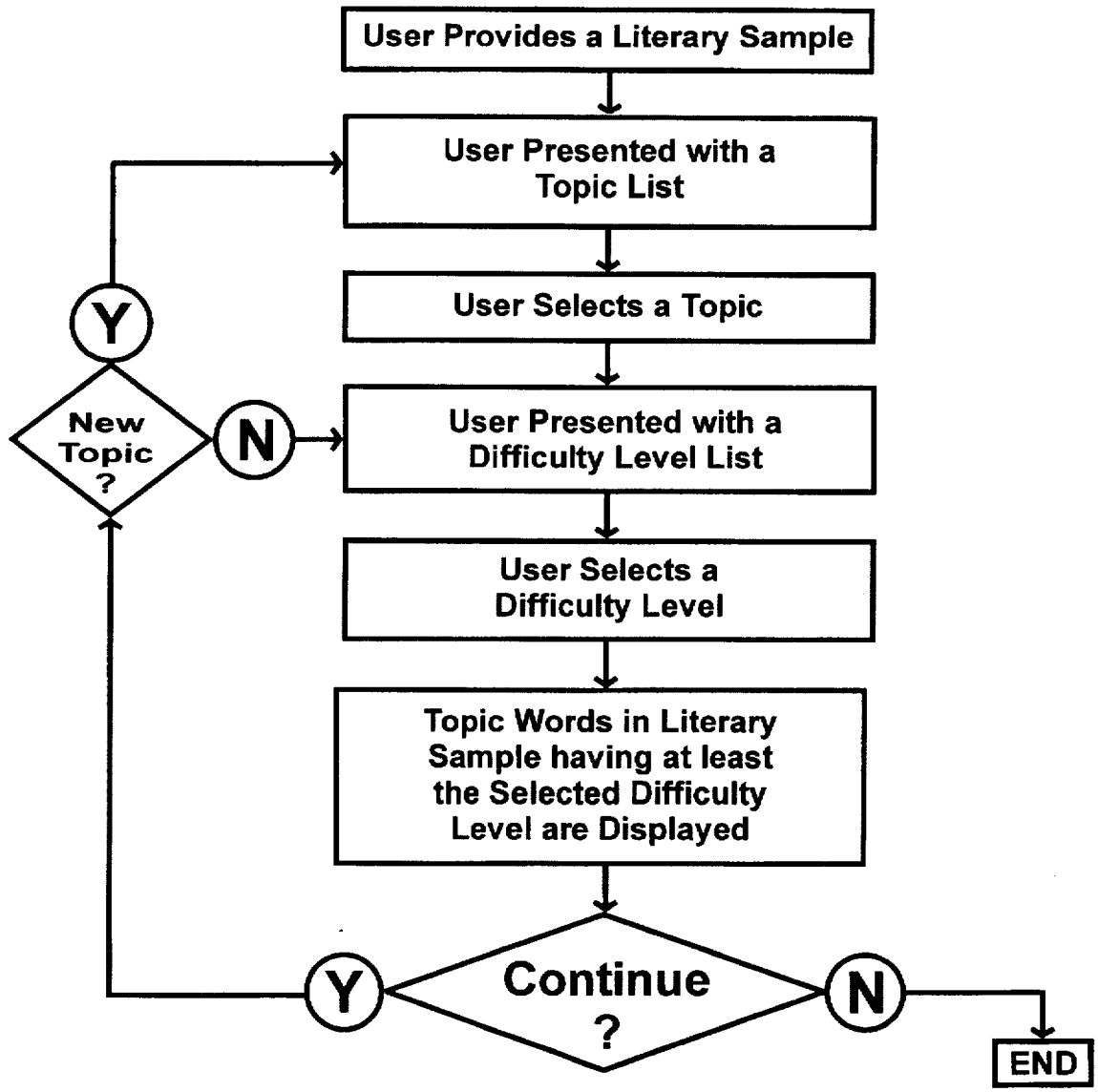
FIG. 10 is a flow diagram illustrating a difficulty assessment module according to aspects of this invention.
Figure 11:
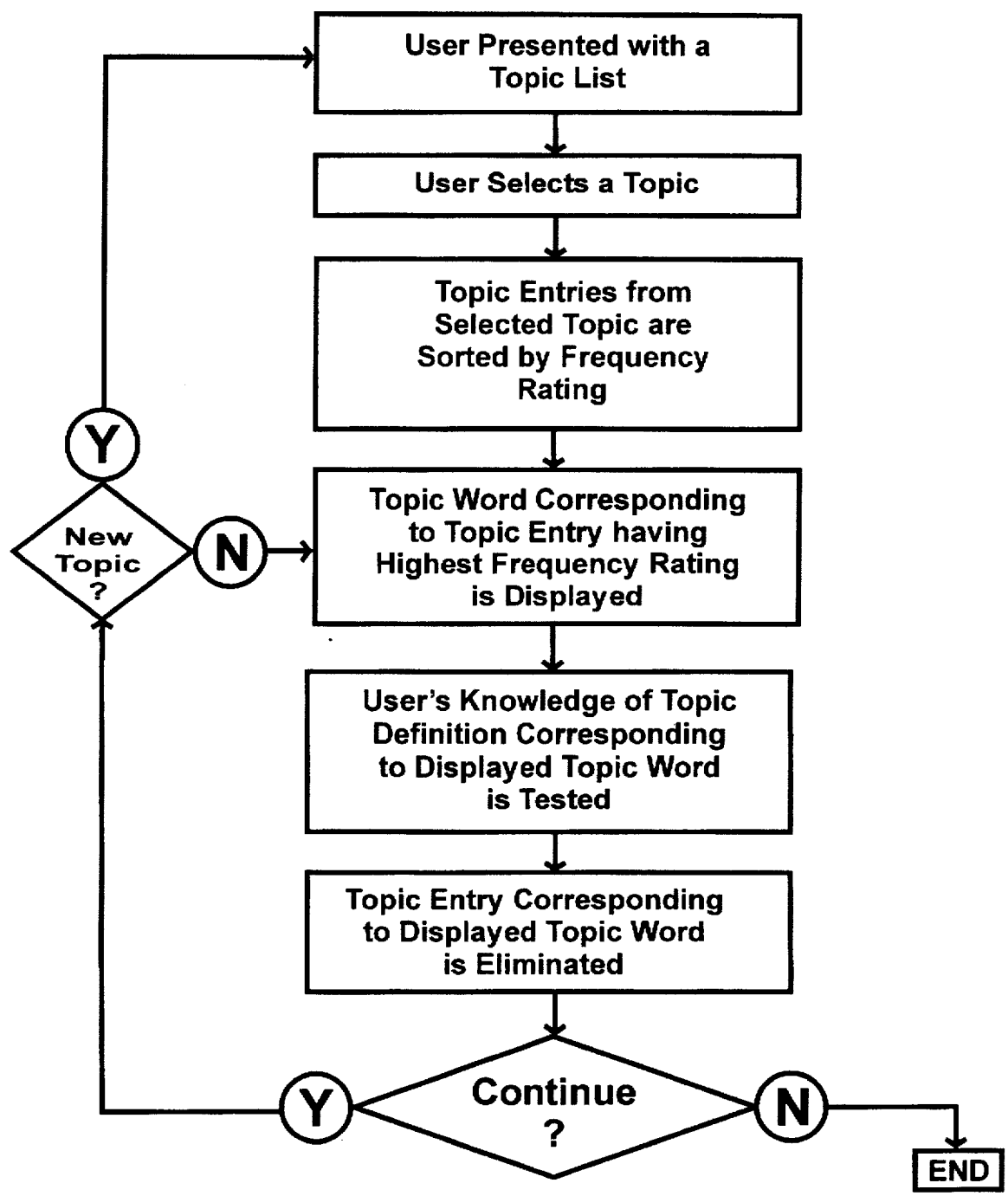
FIG. 11 is a flow diagram illustrating a vocabulary-learning module according to aspects of this invention.

The software commands provided to manipulate information in the database of entries is also stored in CD-ROM 20. Sample software commands are provided in the Appendix. Examples of software logic are illustrated in FIGS. 3, 10 and 11.

Figure 3:
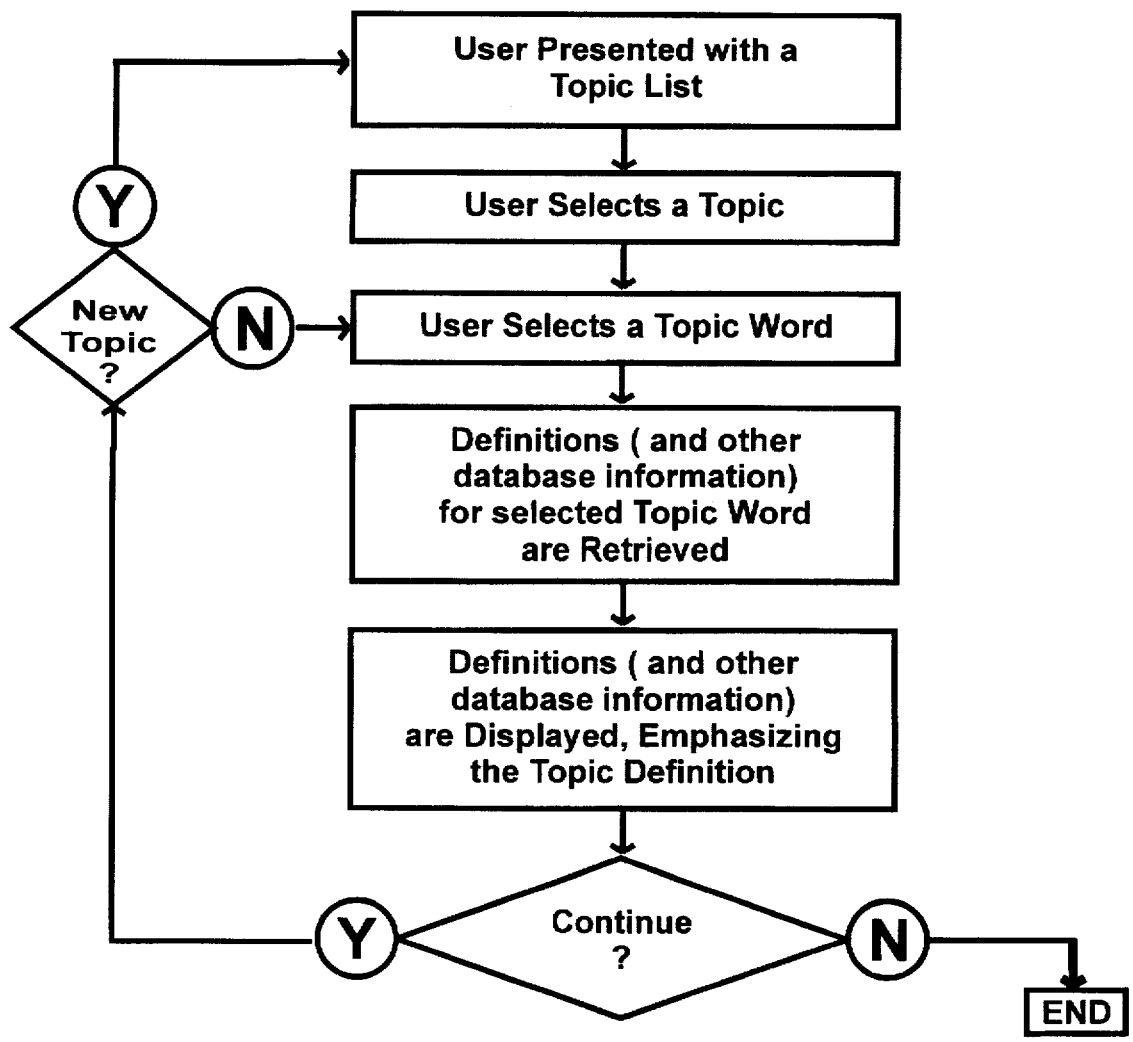
FIG. 3 is a flow diagram illustrating an enhanced dictionary module according to aspects of this invention.

Referring to FIG. 3, the logic of an enhanced dictionary module is illustrated. The enhanced dictionary module permits a system user to retrieve word definitions in a specific arrangement which emphasizes definitions relevant to user-selected topics. The system user is presented with a list of topics for which the database of entries contains topic entries. The user selects a topic of interest for a specific task. For example, if a system user is reading or writing a technical article in the physics discipline, then the user would select the topic "physics."

The user then selects a topic word for which he or she desires a topic definition or other database information. The general and topic definitions for that topic word are then displayed, emphasizing the topic definition. The user then has the option of ending the exercise, selecting a new topic, or selecting a new topic word within the same topic.

Figure 4:
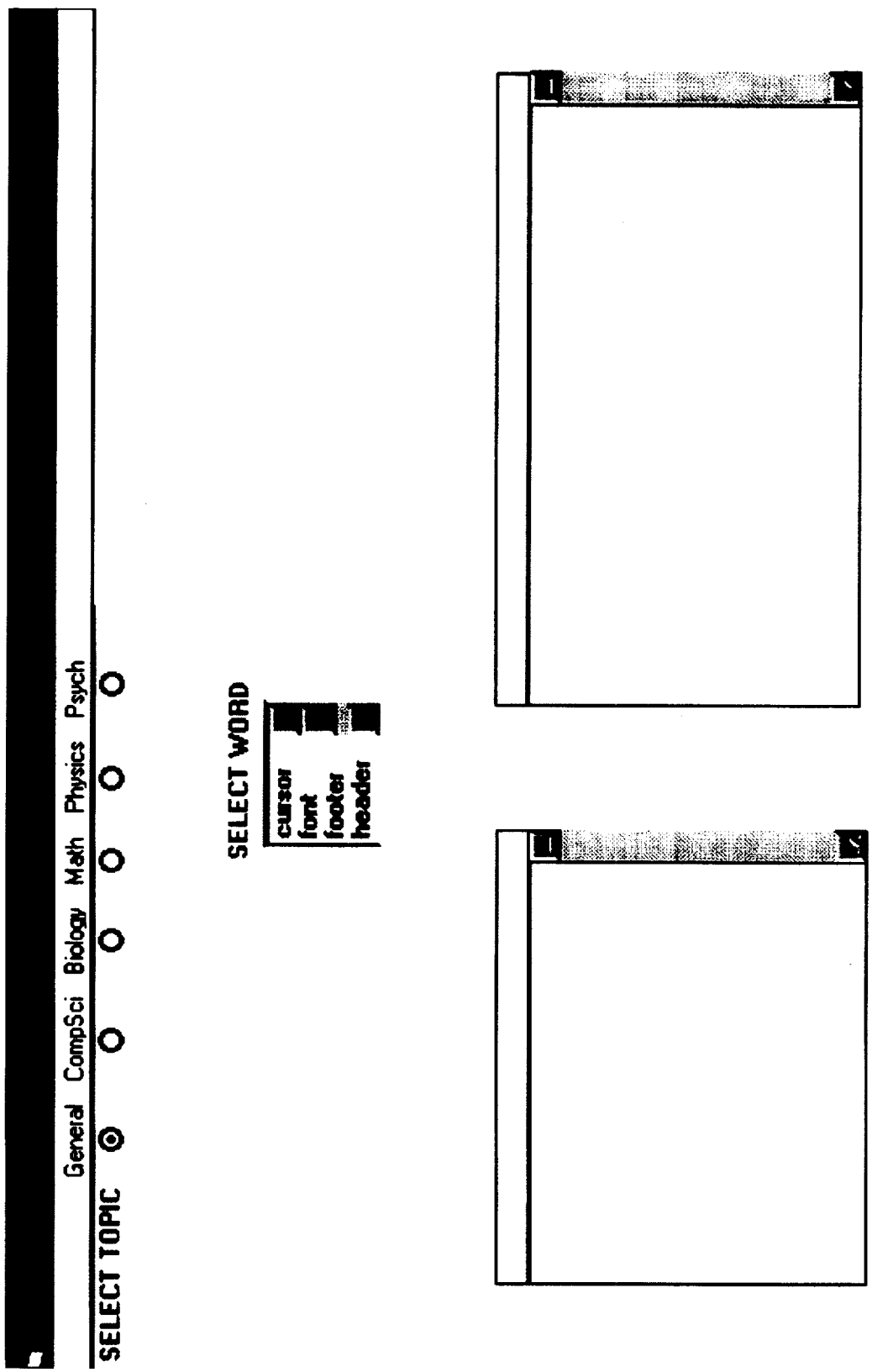
FIG. 4 is one embodiment of a computer screen display adapted for use with an enhanced dictionary module according to this invention.

FIG. 4 illustrates a preferred computer screen display for providing information to a system user by means of output device 18 from FIG. 1, such as a CRT. The display shown in FIG. 4 features a topic selection window near the top of the screen to display a group of topics available for selection by the user. In this particular embodiment, the topics include general computer sciences ("CompSci"), biology, mathematics, physics and psychology ("Psych"). A topic is selected by the user by "clicking" a mouse input device on the desired topic, by using keyboard arrow keys, by using a light pen, or in any other manner. The default topic is labeled "general." In other words, the user selects the topic "general" or simply makes no selection if the task involves no particular topic.

Below the topic selection window is a word selection window in which general words and topic words are listed, preferably in alphabetical order. The word selection window preferably displays a small alphabetical segment of the general and topic word list. The word list preferably does not change in response to the topic selection made in the topic selection window. In other words, the word list preferably remains the same; independent of topic selection. However, the actual segment of the word list appearing in the window will preferably vary in response to user word selection as will be described below.

The word selection window shown in FIG. 4 displays the words "cursor," "font," "footer" and "header." These words are provided merely for purposes of illustration. In a preferred word list, the words illustrated in FIG. 4 would likely be separated by many additional words. Also, the words shown in FIG. 4 are intended simply to illustrate general or topic words—the fact that they all have meanings in the context of computer sciences has no significance. A word selection window of the preferred embodiment might, for example, display the words "cursor," "cursorial," "cursory" and "curst," or the words "font," "Fontainebleau," "fontal" and "fontanel," etc.

The word selection window preferably provides access to all general and topic words recorded in the database of entries. The general word or topic word desired by the user is selected by inputting the desired word using input device 16 (FIG. 1). For example, the user optionally types the word on a computer keyboard to locate the word in the word selection window, followed by pressing a keyboard return key. The nearest words are displayed if the entered word is not in the database or if the user misspelled the desired word. A desired word is optionally selected by using the scroll function at the right side of the word selection window. This function permits a user to scroll upward or downward throughout the word list by use of an input device such as a mouse. Keyboard arrow keys are also optionally used to scroll upward or downward throughout the word list. Systems for providing these functions are well known as described by Reed et al. in U.S. Pat. No. 5,241,671, incorporated herein by reference.

The computer screen display shown in FIG. 4 also includes a topic information display (on the left but not specifically labelled) and a general information display (on the right but not specifically labelled). The topic information display and general information display also include a scroll function so that the user can scroll upward or downward to view retrieved general entry information and topic entry information that cannot fit within the displays at a given moment. In the general display will appear a general definition or other general entry information corresponding to the selected word. In the topic display will appear a topic definition or other topic entry information.

Figure 5B:
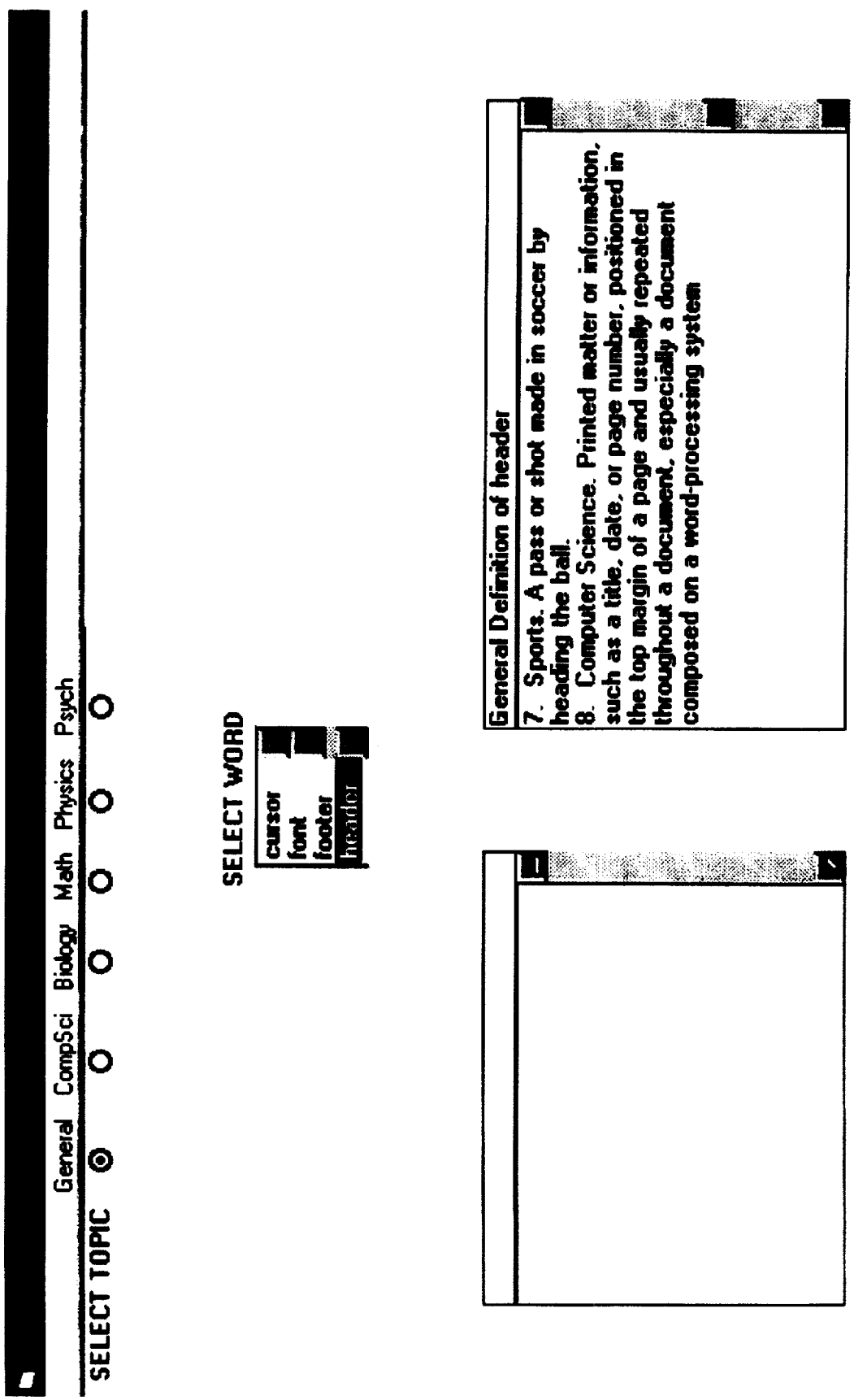
FIG. 5B illustrates a continuation of the computer screen display shown in FIG. 5A.

FIG. 5A shows the display of FIG. 4, wherein the word "header" has been selected in the word selection window. Note also that the topic "general" is indicated either because it has been selected in the topic selection window or because no other topic was selected. The general definition of "header" is displayed in the general information display, indicating that there are at least seven meanings of the word "header." As shown in FIG. 5B, a user has used the scroll function at the right side of the general information display to scroll downward to reach the final definition (No. "8").

FIG. 6 illustrates the display of FIG. 4, wherein the word "header" has been selected from the word selection window and the "CompSci" topic has been selected in the topic selection window. The general definition of "header" appears in the general information display on the right side (as in FIGS. 5A and 5B). Additionally, a topic definition for the word "header" appears in the topic information display on the left side. The topic definition is preferably an abbreviated definition designed for a lay person. However, the topic display optionally includes a detailed definition, supplemental information such as an example of a header in the computer science context, and other information in the topic entry.

Supplemental information is preferably separated from the word definition or definitions so that the definitions are emphasized. For example, a horizontal line below the word definition optionally separates the definition from supplemental information and indicates to the user where the definition ends and where the supplemental information begins.

FIG. 7 shows the display of FIG. 4, wherein the word "footer" is selected in the word selection window and the topic "CompSci" is selected in the topic selection window. The general information display presents the general definition of "footer" and the topic information display presents the computer sciences definition of "footer."

FIG. 8 illustrates definitions for "mouse", wherein the topic remains "CompSci." The word "mouse" is selected in the word selection window, the general definition of "mouse" is shown in the general information display, and the computer sciences definition of "mouse" is shown in the topic information display.

Computer software commands in the language Visual Basic (V-Basic) are illustrated in the Appendix. The commands in the Appendix are examples of commands that are suitable to control the enhanced electronic dictionary module. It is of course contemplated that any computer language is optionally used. One of skill in this art is capable of quickly and easily writing appropriate commands.

The first sub-routine includes code for loading the word selection window with a list of general and topic words. The code of this first sub-routine loads the words "cursor," "font," "footer," "header" and "mouse," which provides the words shown in FIGS. 4 and 8. The preferred code of this sub-routine loads all general and topic words.

The next sub-routine shown in the Appendix supplies general definitions for each of the words in the word selection window. These general definitions are preceded by the command "def$" which acts as a tag to identify the definition as a general definition. The code in this sub-routine also provides the topic definitions in the computer sciences topic for each of the words in the word selection window. The computer science topic definitions are preceded by the tag "def2$". The preferred code of this sub-routine supplies general definitions for all general words and topic definitions for all topic words, as well as all other information to be included in the database of entries.

The next sub-routine provides code to present the definitions a general display and topic display such as those shown in FIGS. 4–8. For example, if "general" is selected from the topic selection window (by choice or by default), then only the general definition and associated information for a selected word is presented in the general information display. However, if a topic other than "general" is selected, the general definition (and other general information) for the selected word will be provided in the general information display and the topic definition (and other topic information) for the selected word will be presented in the topic information display.

Figure 9:
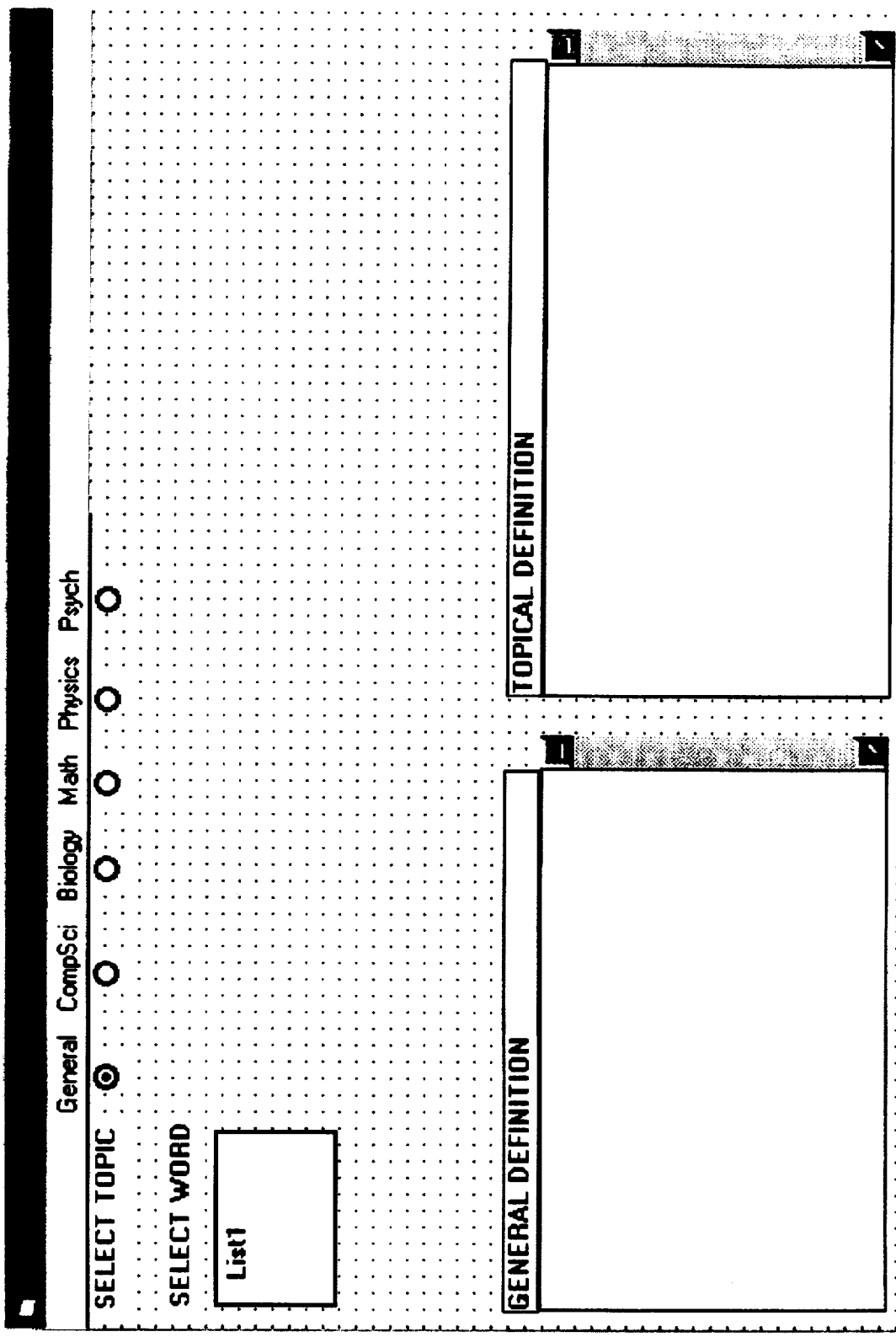
FIG. 9 illustrates one embodiment of a form for defining computer screen displays such as the display illustrated in FIG. 4.

FIG. 9 illustrates the "form" of the computer screen display, defined for purposes of the V-Basic software commands. The form shown in FIG. 9 is used to create screen displays such as the display shown in FIG. 4. It is contemplated that a variety of forms are optionally used to present information in a variety of configurations.

FIGS. 10 and 11 illustrate the logic of optional modules provided to utilize benefits of the enhanced electronic dictionary according to this invention. These optional modules exploit the expanded information of the database of entries as well as the unique ability of an electronic system, such as the one described with reference to FIG. 1, to manipulate the information in the database.

FIG. 10 illustrates the logic of a word-difficulty assessment module for use by one who wishes to target a written work to a particular audience. FIG. 11 illustrates the logic of a vocabulary-learning module for use by one who wishes to test or improve vocabulary knowledge within a specified topic.

A system user that is writing an article for a targeted audience should check the article to make sure that technical language used in the article is either explained for the targeted audience or replaced with more appropriate descriptions. The module illustrated in FIG. 10 evaluates a literary sample provided by the user. The module presents the user with a choice of topics and the user makes a selection or defaults to "general," depending upon the topic of the literary sample. The user is also presented with a choice of difficulty-levels. The difficulty-levels optionally include, for example, knowledge-level categories such as "sophisticated," "moderate," and "naive" or education-level categories such as "high school," "undergraduate education" and "graduate education." A selection is made based on the anticipated knowledge or educational level of the targeted audience. Each difficulty level corresponds to a minimum objective rating such as a minimum frequency rating. For example, the "sophisticated" or "graduate education" categories may be assigned a minimum frequency rating in the low percentile, perhaps the 10th percentile.

After the user has selected a topic and a difficulty level, the module displays all words in the article that have an objective rating below the minimum objective rating associated with the selected difficulty level. The words are optionally displayed in a list or are emphasized within the literary sample text in bold, underlining or in any other manner. For example, a word having an objective rating of 5 (i.e., having a frequency rating in the 5th percentile) will be identified to a user that has selected the "sophisticated" or "graduate education" difficulty levels described earlier.

Once identified, these words can be explained or replaced by the user. The user then has the option to end the exercise, select a new topic or select a new difficulty level. The user also optionally uses the enhanced dictionary module to create a glossary of difficult words to be used as an appendix to the article.

The vocabulary-learning module illustrated in FIG. 11 presents a topic list from which the user makes a selection. Topic words from the selected topic are sorted according to their objective rating, preferably in order from the easiest word (i.e., highest frequency rating percentile) to the most difficult word. The topic words are then presented to the user in an order depending upon their objective rating. For example, the topic word corresponding to the topic entry having the highest frequency rating (easiest word) is optionally displayed to the user to test the user's knowledge of the topic definition. The topic entry corresponding to the displayed topic word is then eliminated from the available topic entries and the user optionally ends the exercise, selects a new topic or continues with the word corresponding to the topic entry having the next highest frequency rating (next to easiest word). The user optionally records a score corresponding to the number of word definitions known to the user.

Figure 12:
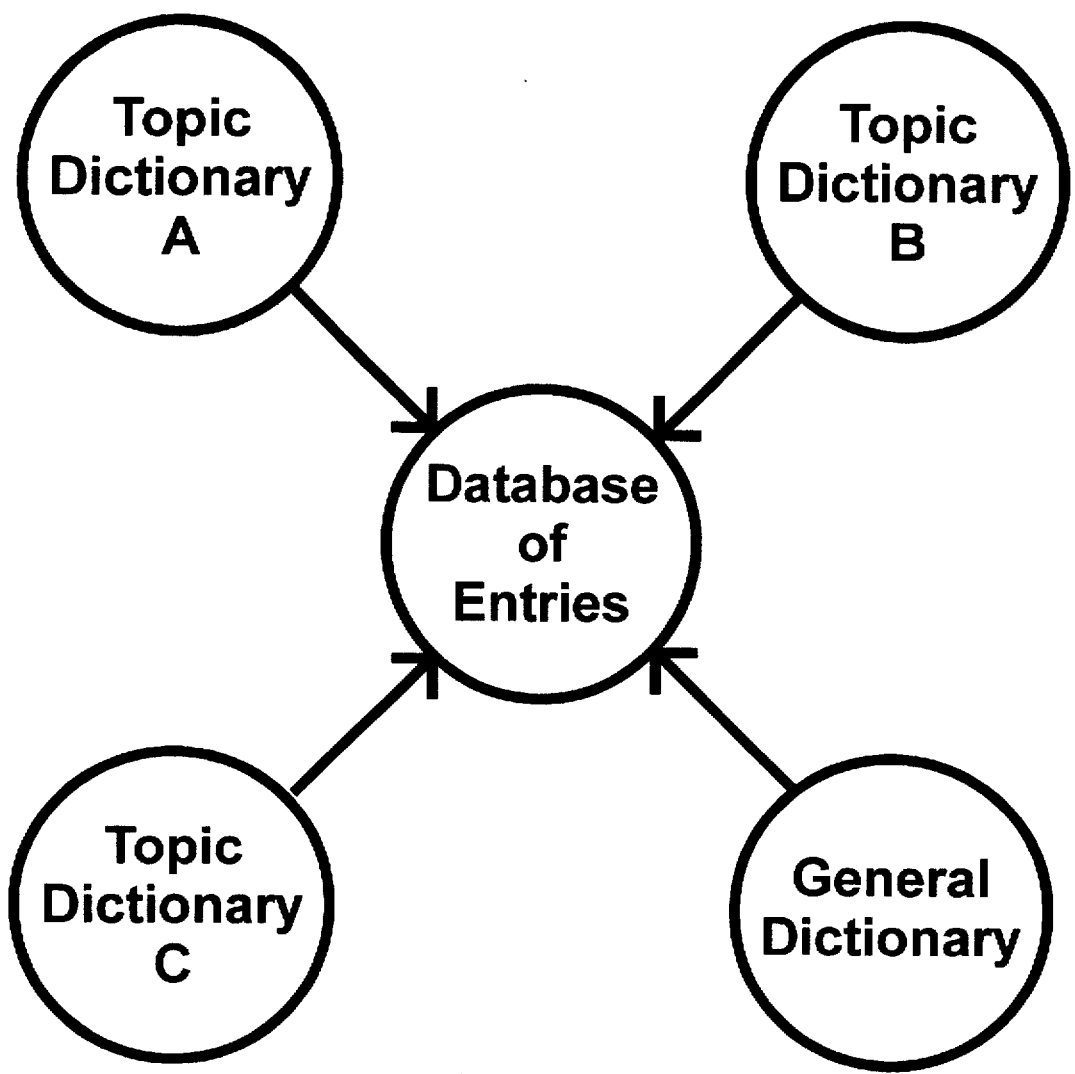
FIG. 12 is a block diagram illustrating sources for a database according to aspects of this invention.

The method according to this invention for creating an enhanced electronic reference is now described with reference to FIG. 12. FIG. 12 illustrates the preferred sources from which the database of entries is formed. Topic words from topic dictionaries A, B and C form the basis for topic entries and general words from a general dictionary form the basis for general entries. Topic words are preferably selected from topic dictionaries based upon their importance within their particular field. In other words, rather than including all topic words from each of the topic dictionaries, it is preferred that the most important topic words are selected. This is preferably accomplished by (1) selecting a general dictionary and at least one topic dictionary; (2) determining an 'objective rating for each topic word from the selected topic dictionary; (3) selecting topic words having a minimum objective rating; (4) compiling the selected topic words with general words from the selected general dictionary; and (5) creating a database of entries based on the general words and the selected topic words.

In step (1), any number of topic dictionaries is optionally selected although, preferably, only one general dictionary is selected. Examples of general and topic dictionaries are described with reference to FIG. 2. Topic dictionaries are optionally glossaries or any other source of words relating to a particular topic, group of topics or to a particular audience.

Step (2) is preferably performed by determining a frequency rating for each topic word. A frequency rating is optionally determined by scanning a literary sample from a relevant topic to find how many times a particular word occurs in the sample. There exist many known systems for scanning.

Topic words are sorted with other topic words from the same topic according to how many times they appear in the sample. A word that appears in a sample more times than any other word receives top rank (100th percentile) and a word that appears least receives bottom rank (0 percentile). The most frequent word (100th percentile) is then, for example, assigned an objective rating of 100 and the least frequent word is assigned an objective rating of 0. Words having a higher objective rating are typically more important to the understanding of the sample and less difficult to understand because of their frequent use.

Step (3) is optionally performed by selecting a minimum objective rating and eliminating topic words having an objective rating less than the selected minimum. This step preferably eliminates the least important words. For example, selecting a minimum objective rating of 20 eliminates about 20% of the words, the eliminated words being the least frequently used and often the least important words.

Step (4) is preferably performed by sorting the general words with the topic words. It is apparent that some words will have both general and topic definitions (such as the word "header" discussed previously).

Step (5) is optionally performed by storing in a database entries including a general or topic word, a corresponding definition, an objective rating and a tag. If a particular word has both a general definition and a topic definition, then separate general and topic entries are preferably created and stored. Each entry is optionally supplemented as described with reference to FIG. 2.

Many modifications are optionally made to the specific embodiments illustrated herein while remaining within the scope of this invention. For example, the system described with reference to FIG. 1 is optionally substituted with any known electric system or device. Also, the general and topic entries optionally include any information that would benefit the system user. The illustrated displays are optionally modified or even eliminated, depending upon the particular application and the nature of the output device selected. Similarly, the database optionally supports user selection of any number of topics from any number of topic sources.

Significant benefits stem from the assignment of an objective rating to each topic word as well as the selection of the most important topic words, based on their assigned objective ratings, for inclusion in the database of entries. For example, speech recognition becomes far more accurate because a user optionally selects a specific topic and the speech recognition program limits its search to topic words within that topic. This accuracy is optionally further enhanced by a system user who also selects a subset of topic words (i.e., the 500 most frequently occurring topic words). Accordingly, a speech recognition module is optionally included to provide topic definitions in response to a user's selection of a topic, selection of a word set based on an objective rating range, and speech of a word into a microphone input device.

In any embodiment, the device and method of this invention provide several important benefits. This invention provides an enhanced dictionary reference including entries for general words as well as entries for important topic words from a variety of disciplines. This invention also provides a dictionary reference capable of presenting a user with a word definition and other information corresponding to a specific topic.

APPENDIX

'The following code loads the word listbox for word selection:

```
Sub Form_Load ()
    List1.AddItem "cursor"
    List1.AddItem "font"
    List1.AddItem "footer"
    List1.AddItem "header"
    List1.AddItem "mouse'
```

'The following code supplies a "General Definition" of a word selected according to an index supplied by the click buttons below the Topics menu:

def$(0) = "A bright, usually blinking, movable indicator on a display, marking the position at which a character can be entered, corrected, or deleted. [Middle English, runner, from Latin, from cursus, past participle of currere, to run.]"

def$(1) = "1. A basin for holding baptismal water in a church. 2. A receptacle for holy water; a stoup.
3. The oil reservoir in an oil-burning lamp. 4.
An abundant source; a fount: She ws a font of wisdom and good sense."

def $(2) = "1. One that is an indicated number of feet in height or length. Often used in combination: a six-footer. 2. Printed matter positioned in the bottom margin of a page, especially a title, page number, or date that is repeated throughout a document created on a word-processing system. 3. See footing."

def$(3) = "1. One that fits a head on an object.
2. One that removes a head from an object, especially a machine that reaps the heads of grain and passes them into a wagon or receptacle. 3. A pipe that serves as a central connection for two or more smaller pipes.
4. A floor or roof beam placed between two long beams that supports the ends of the tailpieces. 5. A brick laid across rather than parallel with a wall.
6. Informal. A headlong dive or fall.
7. Sports. A pass or shot made in soccer by heading the ball. 8.
Computer Science. Printed matter or information, such as a title, date, or page number, positioned in the top margin of a page and usually repeated throughout a document, especially a document composed on a word-processing system."
def$(4) = "1. a. Any of numerous small rodents of the families Muridae and Cricetidae, such as the common house mouse (Mus musculus), characteristically having a pointed snout, small, rounded ears, and a long, naked or almost hairless tail. b. Any of various similar or related animals, such as the jumping mouse, the vole, or the jerboa.
2. A cowardly or timid person.
3. Informal. A discolored swelling under the eye caused by a blow, a black eye. plural mice or mouses.
4. Computer Science: A hand-held, button-activated input device that when rolled along a flat surface directs an indicator to move correspondingly about a computer screen, allowing the operator to move the indicator freely, as to select operations or manipulate text or graphics."
def2$(0) = "A bright, usually blinking, movable indicator on a display, marking the position at which a character can be entered, corrected, or deleted."
def2$(1) = "A complete set of type of one size and face."

-continued

```
def2$(2) = "Printed matter in the bottom margin of a
page, for example, a title, page number, or date."
def2$(3) = "Printed matter or information, such as a
title, date, or page number, positioned in the top margin of
a page."
def2$#(4) = "A hand-held, button-activated input device
that when rolled along a flat surface directs an indicator
to move correspondingly about a computer screen, allowing an
operator to select operations or manipulate text or
graphics."
End Sub
```

The following code supplies a "Topical Definition" of a word selected according to an index supplied by the click buttons below the Topics menu.

```
Sub List1_Click ()
word_index = List1.ListIndex. 'save word index
Rem below clear text..........................
    text2.Text = ""
    text1.Text = ""
Rem finished clear text.........................
Rem now, if general is selected supply definition ddd
If Ind = 0 Then
    text1.Text = def$ (List1.ListIndex)
Rem finished supplying definition dddddddddddddddddddd
Rem if topic is select, supply both defs. ttttttttt
ElseIf Ind = 1 Then
    text1.Text = def$ (List1.ListIndex)
    text2.Text = def2$ (List1.ListIndex)
End If
Rem finished supplying both defs. ttttttttttttttt
End sub
    GENERAL
Dim PriorIndex As Integer
    Dim Ind As Integer
        Dim word_index As Integer
    Dim def(4) As String
    Dim def2(4) As String
Sub Option1_Click (index As Integer)
    Ind = index
    Rem below clear text..........................
        text2.Text = ""
        text1.Text = ""
    Rem finished clear text.........................
    If Ind = 0 Then 'general is selected
        text1.Text = def$(word_index)
    ElseIf Ind = 1 Then 'topic is selected
        text1.Text = def$(word_index)
        text2.Text = def2$(word_index)
    Else 'inactive topic selected
        text1.Text = def$(word_index) 'display gen. def.
        Beep
    End If
End Sub
```

What is claimed is:

1. An enhanced electronic dictionary for retrieving a topical definition corresponding to a selected topic and corresponding to a selected word and for communicating to a user said topical definition separately from other definitions that may correspond to said selected word, said enhanced electronic dictionary comprising:

(A) a database of dictionary entries stored in a memory, said database comprising:

(i) general dictionary entries each comprising a general dictionary word, a general definition assigned to said general dictionary word and a general tag assigned to said general definition, and (ii) topic dictionary entries each comprising a topic dictionary word, a topic definition assigned to said topic dictionary word, a topic tag assigned to said topic definition to identify a topic corresponding to said topic definition, and an objective rating assigned to said topic dictionary word, said objective rating being an objective measure of importance of said topic dictionary word as compared to another said topic dictionary word, wherein said objective rating assigned to each said topic dictionary word selected for inclusion in said database is within a predetermined objective rating range;

(B) commands stored in a memory for manipulating said database of dictionary entries, said commands including a retrieval command configured to retrieve said general definition, said topic definition or said general definition and said topic definition corresponding to said selected topic and assigned to said selected word, said commands also including a communication command configured to communicate to such user said general definition, said topic definition or said general definition and said topic definition corresponding to said selected topic and assigned to said selected word;

(C) a processor connected to said memory to execute said commands;

(D) an input device connected to said processor to receive said selected topic and said selected word; and (E) an output device connected to said processor to communicate to such user said general definition, said topic definition or said general definition and said topic definition corresponding to said selected topic and assigned to said selected word, wherein said topic definition is communicated to such user separately from said general definition.

2. The enhanced electronic dictionary described in claim 1, wherein said objective rating corresponds to a frequency with which said topic dictionary word occurs in a topic sample.

3. The enhanced electronic dictionary described in claim 1, wherein said objective rating corresponds to a percentage of people from a sample of people familiar with said topic who know said topic definition associated with said topic dictionary word.

4. The enhanced electronic dictionary defined in claim 1, further comprising a word-difficulty assessment module stored in a memory and adapted to assess the difficulty of topic dictionary words from said selected topic in a passage, said word-difficulty assessment module including a display command configured to display those topic dictionary words corresponding to said selected topic from said passage having an assigned objective rating within a pre-determined objective rating range.

5. The enhanced electronic dictionary defined in claim 1, further comprising a vocabulary-learning module stored in a memory and adapted for testing or teaching the meaning of topic dictionary words from said selected topic, said vocabulary-learning module including a sort command configured to sort said topic dictionary words from said selected topic according to said objective rating assigned to each of said topic dictionary words, said vocabulary-learning module also including a display command configured to display said topic dictionary words in a pre-determined order according to said objective rating.

6. An enhanced electronic dictionary for retrieving a topical definition corresponding to a preselected topic and corresponding to a selected word and for communicating to a user said topical definition separately from other definitions that may correspond to said selected word, said enhanced electronic dictionary comprising:

storing means for storing a database of entries, said database of entries including general entries each having a general word, a general definition assigned to said general word, and a general tag assigned to said general definition, and said database of entries including topic entries each having a topic word, a topic definition assigned to said topic word, a topic tag assigned to said topic definition to identify a topic corresponding to said topic definition, and an objective rating assigned to said topic word, said objective rating being an objective measure of importance of said topic word as compared to another said topic word, wherein said objective rating assigned to each said topic word selected for inclusion in said database is within a pre-determined objective rating range;

manipulating means connected to said storing means for manipulating said database of entries, said manipulating means including means for retrieving a general definition, a topic definition or a general definition and a topic definition corresponding to said preselected topic and assigned to said selected word, said manipulating means also including means for communicating to such user a general definition, a topic definition or a general definition and a topic definition corresponding to said preselected topic and assigned to said selected word;

processing means connected to said storing means for processing said manipulating means;

input means connected to said processing means for receiving said preselected topic and said selected word;

display means connected to said processing means for displaying to such user a general definition, a topic definition or a general definition and a topic definition corresponding to said preselected topic and said selected word;

wherein said display means displays said topic definition that is retrieved and communicated by said manipulating means separately from said general definition that is retrieved and communicated by said manipulating means.

7. A method for producing an enhanced dictionary reference adapted for use as part of an electronic dictionary, said method comprising the steps of:

(A) forming a database of entries by
  (i) providing general entries each having a general word, a general definition assigned to said general word, and a general tag assigned to said general definition,
  (ii) assigning objective ratings to a plurality of topic words pertaining to various topics, said objective ratings being an objective measure of importance of said topic words as compared to other said topic words,
  (iii) selecting at least a portion of said topic words based upon said objective ratings assigned to said topic words for inclusion in said database of entries, wherein said topic words are selected based on a pre-determined objective rating range,
  (iv) providing topic entries each having one said topic word, a topic definition assigned to said topic word, said objective rating, and a topic tag assigned to said topic definition;

(B) providing a retrieval command for causing retrieval of a general definition, a topic definition or a general definition and a topic definition corresponding to a selected topic and assigned to a selected word;

(C) providing a communication command for causing communication of a general definition, a topic definition or a general definition and a topic definition corresponding to said selected topic and assigned to said selected word, wherein said communication command communicates a retrieved topic definition corresponding to said selected topic and assigned to said selected word separately from a retrieved general definition assigned to said selected word; and (D) storing said database of entries and said commands in at least one memory.

8. The method described in claim 7, wherein said step of assigning said objective ratings to said topic words includes the sub-steps of:
  (A) determining frequencies with which each said topic word appears in a topic sample; and
  (B) assigning said objective ratings to said topic words based upon said frequencies.

9. A method for providing a topical word definition corresponding to a selected word and to a selected topic separately from a general word definition corresponding to said selected word, said method comprising the steps of:

(A) forming a database of entries by
  (i) providing general entries each having a general word, a general definition assigned to said general word, and a general tag assigned to said general definition,
  (ii) assigning objective ratings to a plurality of topic words pertaining to various topics, said objective ratings being an objective measure of importance of said topic words as compared to other said topic words,
  (iii) selecting at least a portion of said topic words based upon said objective ratings assigned to said topic words for inclusion in said database of entries, wherein said topic words are selected based on a pre-determined objective rating range,
  (iv) providing topic entries each having one said topic word, a topic definition assigned to said topic word, said objective rating, and a topic tag assigned to said topic definition;

(B) storing said database of entries in a memory;

(C) in operation, retrieving a general definition, a topic definition or a general definition and a topic definition corresponding to said selected topic and assigned to said selected word; and (D) providing said general definition, said topic definition or said general definition and said topic definition corresponding to said selected topic and assigned to said selected word, wherein said topic definition corresponding to said selected topic and assigned to said selected word is provided separately from said general definition assigned to said selected word.

10. The method described in claim 9, wherein said step of assigning said objective ratings to said topic words includes the sub-steps of:
  (A) determining frequencies with which each said topic word appears in a topic sample; and
  (B) assigning said objective ratings to said topic words based upon said frequencies.

11. An electronic dictionary apparatus for providing general word definitions and topical word definitions pertaining to various topics to a user, said electronic dictionary apparatus being adapted to retrieve a topical word definition corresponding to a selected topic and corresponding to a selected word and to communicate to such user said topical word definition separately from a general word definition corresponding to said selected word, said electronic dictionary apparatus comprising:

a memory storing a database comprising a plurality of general dictionary words, a general definition assigned to each of said general dictionary words, and a general tag assigned to each said general definition, wherein said general tag indicates that a corresponding definition is a general definition;

said database also comprising a plurality of topical dictionary words, a topical definition assigned to each of said topical dictionary words, a topic tag assigned to each said topical definition to indicate the identity of a topic for a corresponding topical definition, and an objective rating assigned to each of said topical dictionary words, said objective rating being an objective measure of importance of each of said topical dictionary words compared to other said topical dictionary words;

wherein every one of said topical dictionary words selected for inclusion in said database has an assigned objective rating within a pre-determined objective rating range;

said memory also storing commands for manipulating said database, said commands comprising a retrieval command configured to retrieve from said database a general definition, a topical definition, or a general definition and a topical definition corresponding to said selected topic and assigned to said selected word;

said commands also comprising a communication command configured to communicate said general definition, said topical definition, or said general definition and said topical definition retrieved by said retrieval command;

a processor connected to said memory to execute said commands;

an input device connected to said processor to receive from such user said selected topic and said selected word; and an output device connected to said processor to display to such user a retrieved general definition, a retrieved topical definition, or a retrieved general definition and a retrieved topical definition assigned to said selected word;

wherein said output device displays to such user said retrieved topical definition separately from said retrieved general definition.

12. The electronic dictionary apparatus defined in claim 11, wherein said objective rating corresponds to a frequency with which said topical dictionary words occur in a topic sample.

13. The electronic dictionary apparatus defined in claim 11, wherein said objective rating corresponds to a percentage of people from a sample of people familiar with said topic who know said topical definition assigned to said topical dictionary word.

* * * * *